United States Patent Office 2,850,489
Patented Sept. 2, 1958

2,850,489

POLYVINYL ALCOHOL FROM POLYVINYL ESTER

Norris Turnbull, Grand Island, N. Y., assignor to E. I. du Pont de Nemours and Company, Wilmington, Del., a corporation of Delaware No Drawing. Application November 10, 1953
Serial No. 391,391

19 Claims. (Cl. 260—91.3)

This invention relates to the treatment of polyvinyl ester and with its alcoholysis in the presence of agents which react with potential color formers to produce polyvinyl alcohol of improved color.

The prior art discloses procedures for making polyvinyl alcohol by alcoholysis of the ester but when efforts are made to speed up the reaction, particularly when alkali metal alcoholate is used as alcoholysis catalyst, the resultant product is of unsatisfactory color. This color for many purposes cannot be tolerated and is particularly objectionable in the making of films, certain laminates, moldings and aqueous solutions used for various purposes. Acid catalyzed alcoholysis of polyvinyl ester in general results in products of better color than alkali metal base catalyzed alcoholysis. However, alkali base catalysts permit much faster alcoholysis and are generally much more economical to operate. Therefore, there is a need for a new procedure whereby the advantage of faster alkali catalysis can be used with the production of a product of improved color.

It is the purpose of the present invention to provide a simple and rapid process for making polyvinyl alcohol from polyvinyl ester, particularly from polyvinyl acetate. It is also the purpose to produce polyvinyl alcohol of low color by such rapid process. Another purpose is to produce polyvinyl alcohol by alkaline alcoholysis of polyvinyl acetate treated to inactivate color forming agents present in the ester. It is also the purpose to add color suppressing agents to polyvinyl ester solution before, during or after alkaline alcoholysis. A further purpose is to combine an acid pretreatment of the polyvinyl ester solution with the addition of color suppressing agents. Other purposes will be apparent as the invention is further described.

These and other purposes of this invention can be accomplished by pretreating an alcohol solution of polyvinyl ester e. g., polyvinyl acetate, with a small amount of an acid, preferably, a strong acid, such as sulfuric acid, prior to the addition of alkali metal alcoholate to catalyze the alcoholysis of the polymer. The acid pretreated polyvinyl ester solution may also advantageously be treated with color suppressing agents during alcoholysis. Color suppressing agents may be reducing, oxidizing, halogenating or aldehyde complexing compounds such as sodium hydrosulfite, sulfur dioxide, peroxygen compounds, chlorine, sodium metabisulfite, hydroxylamine, etc.

My experiments have led me to believe that the color in polyvinyl alcohol is due to reactions of small or trace amounts of impurities which during alkaline alcoholysis lead to colored compounds. These potential color formers may be aldehydes or they may have other potential chromophoric atomic groupings. These impurities are so difficult to separate physically from the ester that separation schemes in general are economically impractical. I have discovered that pretreatment of the polyvinyl ester with sulfuric acid prevents some of these color formers from developing and in general such acid treated solutions on alcoholysis of the ester yield polyvinyl alcohols having much less color than is the case without acid pretreatment. I have found that treatment of the resin solution during alcoholysis with other agents or additives compatible with the system will further decrease or inactivate potential color formers. It may be assumed that these agents act by forming more or less stable complexes with aldehyde type of impurities or by otherwise reacting with double bonds between carbon atoms or between carbon and oxygen atoms such as by oxidation, reduction or addition thereto so as to interfere with the development of colored impurities in the resulting polyvinyl alcohol.

For the purpose of illustration of the practice of my invention, the following examples are given.

*Example 1.—Sulfuric acid pretreatment (two hours)*

Four thousand grams of high viscosity polyvinyl acetate, dissolved in methyl alcohol, which would yield about 55 to 60 c.p polyvinyl alcohol (4% solution in water) was mixed with 66.5 cc. of 1% sulfuric acid at 60° C. for two hours and was then rapidly cooled to room temperature. This acid treated polyvinyl acetate solution was then subjected to alcoholysis in a continuous process.

The apparatus consisted essentially of three glass vessels arranged in series so that effluent from one overflowed into the next. The contents in all three vessels could be kept agitated by usual types of stirring devices. The first vessel served as the main reactor in which alcoholysis of the polyvinyl acetate largely took place. The second vessel was the finisher in which alcoholysis was carried to the degree desired and the overflow from this finisher then entered the third vessel which served as neutralizer in which the alkali catalyst was neutralized by addition of acetic acid.

Five hundred cc. of methanol and 10 cc. of 10% sodium methylate were heated to 56° C. with stirring in the first vessel or reactor. The sulfuric acid treated polymer was added to the solution of catalyst, with good mixing, at an average rate of about 370 cc. per hour for nine hours. A two percent solution of sodium methylate in methyl alcohol was also fed to the reactor at about 86 cc. per hour. The percent sodium methylate in the reactor varied from 0.19 to about 0.21% during most of the run. The temperature of the reactor varied between 55–65.5° C. The resulting slurry of polyvinyl alcohol in the reactor was fairly thin and mobile. After two hours operation the mixture from the reactor flowed continuously to the second vessel or finisher where the alcoholysis was completed. The slurry of polyvinyl alcohol flowed continuously from the second vessel and after four hours operation the flow started into the third vessel or neutralizer where the sodium methylate was neutralized with acetic acid. The product of the last five hours of operation was considered typical of this system. The polyvinyl alcohol so produced was filtered off and dried for characterization.

The color of the polyvinyl alcohol powder prepared from the sulfuric acid treated polymer was 6.6% yellow compared with 12 to 14% yellow for polyvinyl alcohol made from untreated polymer. The ten percent aqueous solution prepared from the treated polyvinyl alcohol was 150 APHA color (American Public Health Association color standards) compared with about 250 APHA color for solutions of the untreated product. A sample of polyvinyl butyral made from the treated polyvinyl alcohol was about 5% yellow compared with about 8% made from the untreated product. The percent yellow is measured with a Hunter reflectometer which measures reflectance of light from the polyvinyl alcohol through a green and blue filter. It is calculated as follows:

Percent yellow =

$$\left(\frac{\text{Percent reflectance with green filter} - \text{percent reflectance with blue filter}}{\text{Percent reflectance with green filter}}\right)$$

*Example 2.—Sulfuric acid pretreatment (one hour)*

Four thousand grams of high viscosity polyvinyl acetate (31.5% solids) which would yield about 55 to 60 cp. viscosity polyvinyl alcohol was mixed with 66.5 cc. of 1% sulfuric acid at 60° C. for one hour and was then cooled to room temperature.

Five hundred cc. of methanol and 3 cc. of 30% sodium methylate were heated to 56° C. with stirring in the reactor. The sulfuric acid treated polymer was added to the solution of catalyst at the average rate of about 375 cc. per hour for about 10 hours. The apparatus set up was similar to that described in Example 1.

A 2% solution of sodium methylate in methyl alcohol was also fed to the reactor at about 93 cc. per hour. The percent sodium methylate in the reactor varied from about 0.21 to 0.23% during most of the run. The temperature was maintained at 55° to 56.5° C. The slurry of polyvinyl alcohol, produced by the reaction, overflowed into the second vessel after about two hours. The polyvinyl alcohol slurry overflowed continuously from the second to a third vessel where the sodium methylate was neutralized with acetic acid. The product collected in the neutralizer for the last one hour and forty-five minutes was maintained at about 56° C. It was filtered off and dried and screened through a 40 mesh per inch screen.

The color of the polyvinyl alcohol prepared from the acid treated polymer was 7.5% yellow, measured as in Example 1. This compares with about 12 to 14% yellow for polyvinyl alcohol made from untreated polymer.

A sample of polyvinyl butyral made from the treated polyvinyl alcohol was about 4.5% yellow, compared with about 8% for polyvinyl butyral made from untreated product. This sample of polyvinyl butyral was satisfactory in color for safety glass manufacture.

*Example 3.—Sulfuric acid pretreatment (15 minutes)*

The acid treatment of the polymer was similar to Example 1 except that a medium viscosity polyvinyl acetate of 37% solids was used which would yield on hydrolysis a polyvinyl alcohol whose 4% aqueous solution would be about 30 cp. viscosity. The polymer was treated in 1-kg. increments with 14.6 cc. of 1% $H_2SO_4$ for 15 minutes at 60° C. The apparatus was the same as used in the preceding example and the conditions were approximately the same. The significant variables and results are as follows:

| | |
|---|---|
| Time of run | 12.5 hr. |
| Av. feed polymer, cc./hr | 227. |
| Av. cc. 2% $CH_3ONa$/hr | 110. |
| Alkalinity range, percent $CH_3ONa$ | 0.10–0.29. |
| Temperature, °C | 54–56. |
| Polyvinyl alcohol, percent yellow | 7.8–8 (Hunter reflectometer). |
| Polyvinyl alcohol, percent yellow (untreated) | 14.5 (Hunter reflectometer). |
| Percent yellow derived polyvinyl butyral made from treated polymer | 4.0 (Hunter reflectometer). |
| Derived polyvinyl butyral, percent yellow (untreated) | 8.5 (Hunter reflectometer). |

*Example 4.—Sulfuric acid pretreatment (stripping pretreated solution)*

Apparatus was that used in Example 1 except that a column was provided for continuous countercurrent stripping of the acid treated polymer solution with methyl alcohol vapors.

Four kg. of medium viscosity polyvinyl acetate solution of 37% solids in methyl alcohol, of the grade used in Example 3, was mixed with 200 cc. of 1% sulfuric acid at 25° C. The polymer solution containing the acid was fed into a 50 mm. x 4 ft. column packed with ½ in. Berl saddles over a period of 12 hours. One gallon of methanol was vaporized over a period of 12 hours and the vapors were passed countercurrent to the polymer stream in the column. The effluent from the column was cooled to room temperature and was then fed into the alcoholysis unit. In all other respects, the operation was similar to that outlined in the preceding example. The significant variables were these:

Conditions essentially as indicated in Example 1.

| | |
|---|---|
| Volume of treated polymer | 4800 cc. |
| Time of run | 10¼ hr. |
| Av. feed polymer, cc./hr | 468. |
| Av. cc. 2% $CH_3ONa$/hr | 156.5. |
| Alkalinity range, percent $CH_3ONa$ | 0.19–0.25. |
| Temperature, °C | 54.5–55.5. |
| Polyvinyl alcohol [1], percent yellow | 6.9 (Hunter reflectometer). |
| Polyvinyl alcohol, percent yellow blank run | 14.5 (Hunter reflectometer). |
| Derived polyvinyl butyral, percent yellow | 3.2 (Hunter reflectometer). |
| Polyvinyl butyral from untreated polyvinyl alcohol, percent | 8.5 (Hunter reflectometer). |

[1] Neutralized slurry filtered hot.

*Example 5.—Sulfuric acid pretreatment (two hours—low acid)*

Four thousand grams of medium viscosity polymer of 37% solids was mixed with 31.2 cc. of 1% sulfuric acid at 60° C. for two hours. This solution was then neutralized with dilute sodium methylate using metacresol purple to determine the end point. This solution was cooled and used for the alcoholysis. Apparatus and procedure was the same as in Example 1, with the following details:

| | |
|---|---|
| Time of run | 10 hr. |
| Av. feed polymer, cc./hr | 435. |
| Av. cc. 2% $CH_3ONa$/hr | 121. |
| Alkalinity range, percent $CH_3ONa$ | 0.20–0.28. |
| Temperature, °C | 55–57. |
| Polyvinyl alcohol, percent yellow | 8.2 (Hunter reflectometer). |
| Polyvinyl alcohol, percent yellow blank untreated | 14.5 (Hunter reflectometer). |
| Derived polyvinyl butyral, percent yellow | 4.0 (Hunter reflectometer). |

*Example 6.—Sulfuric acid pretreatment (two hours—high acid)*

Three kg. of medium viscosity polyvinyl acetate solution of 37% solids in methyl alcohol of the grade used in Example 3 was mixed with 150 cc. of 1% $H_2SO_4$. It was mixed at 55–65° C. for two hours and was then subjected to alkaline catalyzed methanolysis. Apparatus and procedure was the same as in Example 1 and with the following details:

| | |
|---|---|
| Time of run | 8⅓ hr. |
| Av. polymer, cc./hr | 366. |
| Av. cc. 2% $CH_3ONa$/hr | 172. |
| Alkalinity range, percent $CH_3ONa$ | 0.19–0.27. |
| Temperature, °C | 53–56° C. |

Polyvinyl alcohol, percent yellow --- 7.0 (Hunter reflectometer).

Polyvinyl alcohol, percent yellow untreated -------------------- 14.5 (Hunter reflectometer).

Derived polyvinyl butyral, percent yellow ---------------------- 4.3 (Hunter reflectometer).

Polyvinyl butyral from untreated polyvinyl alcohol, percent yellow ----- 8.5 (Hunter reflectometer).

*Example 7.—Phosphoric acid pretreatment (stripping pretreated solution)*

In general, the apparatus and procedure followed Example 1.

Four kg. of medium viscosity polyvinyl acetate polymer of 37% solids was mixed with 1.63 cc. of 85% $H_3PO_4$ dissolved in methanol at 25° C. The acidic solution of polymer was fed continuously into the top of a 50 mm. x 4 ft. column packed with ½ in. Berl saddles. Four liters of methanol were fed continuously for 11 hours into a vaporizer and the vapors of methanol were passed countercurrent to the polymer solution. The polymer solution was cooled to room temperature and was then alcoholized as in Example 1. Variables and results are listed below:

Time of run ------------------- 9.5 hr.
Av. polymer, cc./hr ----------- 490.
Av. cc. 2% $CH_3ONa/hr$ ------- 171.5.
Alkalinity range, percent $CH_3ONa$ -- 0.20–0.23.
Temperature, °C --------------- 54.5–56.
Polyvinyl alcohol, percent yellow --- 9.8 (Hunter reflectometer).

Polyvinyl alcohol, percent yellow untreated -------------------- 14.5 (Hunter reflectometer).

Derived polyvinyl butyral, percent yellow ---------------------- 4.2 (Hunter reflectometer).

Derived polyvinyl butyral from untreated polyvinyl alcohol, percent yellow ---------------------- 8.5 (Hunter reflectometer).

*Example 8.—Acetic acid pretreatment*

The same apparatus as in Example 4 was used.

Three kg. of medium viscosity polyvinyl acetate polymer of 37% solids was mixed with 3.0 cc. of glacial acetic acid in 200 cc. methyl alcohol. The acidic polymer solution was heated to about 60° C. and 2 liters of methanol were vaporized and passed through the solution over a period of two hours. The solution was then cooled to 25° C. and was alcoholized as in Example 1. Tabulated variables are:

Time of run------------------- 9.67 hr.
Av. polymer feed, cc./hr------ 310.
Av. feed cc. 2% $CH_3ONa/hr$ -- 141.
Alkalinity range, percent $CH_3ONa$ --- 0.18–0.28.
Temperature, °C -------------- 53–56.
Polyvinyl alcohol, percent yellow---- 10.8 (Hunter reflectometer).

Polyvinyl alcohol, percent yellow untreated -------------------- 14.5 (Hunter reflectometer).

Derived polyvinyl butyral, percent yellow --------------------- 6.7 (Hunter reflectometer).

Derived polyvinyl butyral from untreated polyvinyl alcohol, percent yellow --------------------- 8.5 (Hunter reflectometer).

*Example 9.—Paratoluene sulfonic acid*

About 10,500 g. of medium viscosity polyvinyl acetate solution in methyl alcohol of 43% solids which contained 0.2% vinyl acetate was continuously mixed with p-toluene sulfonic acid equivalent to 0.18% of the contained polymer. This polymer solution was continuously mixed with the p-toluene sulfonic acid at 55–60° C. with a mixing screw which acted as a pump. The heated and mixed solution passed through a chamber at rate such that the minimum time of treatment was about 5 minutes. The conditions of the continuous alcoholysis are indicated below.

Alkaline catalyzed alcoholysis:
   Reactor ---------------------- Same as Ex. 1.
   Time of run (hrs.)------------ 10.
   Av. polymer feed in cc./hr---- 1050.
   Av. feed 10% $CH_3ONa$ cc./hr-- 77.
   Alkalinity range percent $CH_3ONa$-- 0.45–0.35.
   Temperature, °C -------------- 55–60.
   Polyvinyl alcohol composite of neutralized-dry product, percent yellow by Hunter reflectometer----- 13.0.
   APHA color of 10% aqueous solution of product--------------- >75 <100.
   Percent yellow — blank run — no treatment--------------------- 17.
   APHA color of 10% solution of polyvinyl alcohol from blank run- >125 <150.

*Example 10.—Sulfuric acid pretreatment and sodium metabisulfite*

The acid treatment of polyvinyl acetate is especially advantageous for the manufacture of polyvinyl alcohol for conversion to low color polyvinyl butyral. The treatment of the polymer with $H_2SO_4$ followed by alcoholysis in the presence of sodium metabisulfite is advantageous for the manufacture of low color polyvinyl alcohol which will yield solutions of improved color. This is especially useful for film applications.

The acid treatment of the medium viscosity polymer of 28.9% solids was the same as in Example 4 except that the polymer in 30-g. increments was treated with 0.5 cc. 1% $H_2SO_4$ in MeOH for 5 minutes at 50 to 60° C. prior to alcoholysis. Significant variables and results are:

Time of run------------------- 12.25 hr.
Av. polymer feed, cc./hr------ Ca. 360.
Av. feed 2% $CH_3ONa$, cc./hr-- 173.
Alkalinity range, percent $CH_3ONa$--- 0.24–0.54.
Sodium metabisulfite added in 0.0935 g. increments every 30 minutes----- 2.29 g.
Temperature, °C -------------- 55–58.
Polyvinyl alcohol, percent yellow----- 8.3 (Hunter reflectometer).

Polyvinyl alcohol, percent yellow untreated--------------------- 14.5.
APHA color of 10% aqueous soln. of polyvinyl alcohol --------------- Ca. 50.

*Example 11.—Sodium metabisulfite and hydrazine*

The hydrolysis of polyvinyl acetate in the presence of a mixture of the sodium metabisulfite and hydrazine gave polyvinyl alcohol and derived polyvinyl butyral of low color. The mixture gave a greater reduction in color than that produced by the individual additives. The polyvinyl alcohol was especially suitable for production of colorless solutions and films.

The alcoholysis was carried out as indicated in Example 1 except that sodium metabisulfite equivalent to 0.25% of the medium viscosity polyvinyl acetate and hydrazine in the same amount were added in increments.

Medium viscosity polymer of 37% solids was used. The polyvinyl acetate was not pretreated with acid. The results and variables were as follows:

| | |
|---|---|
| Time of run | 12.5 hr. |
| Av. polymer feed, cc./hr | 274. |
| Av. feed 2% $CH_3ONa$, cc./hr | 135. |
| Alkalinity range, percent $CH_3ONa$ | 0.21–0.24. |
| Temperature, °C | 55–56. |
| Polyvinyl alcohol, percent yellow | 4.2 (Gen. Elec. reflectometer). |
| Polyvinyl alcohol, percent yellow blank run | 12 (Gen. Elec. reflectometer). |
| Derived polyvinyl butyral, percent yellow | 3.3 (Gen. Elec. reflectometer). |
| Derived polyvinyl butyral from untreated product | 6.8 (Gen. Elec. reflectometer). |
| APHA color 10% polyvinyl alcohol solution | <25. |

*Example 12.—Sodium metabisulfite and sodium hydrosulfite*

The combination of the aldehyde complexing agent and the reducing agent had a synergistic effect in reducing the color of the polyvinyl alcohol and derived polyvinyl butyral.

The alcoholysis was carried out as indicated in Example 1 except that sodium metabisulfite equivalent to 0.5% of the medium viscosity polyvinyl acetate and sodium hydrosulfite equivalent to 0.25% of the polymer was added in increments to the alcoholysis mixture. No acid pretreatment of the polyvinyl acetate took place. Variables of the process and results were as follows:

| | |
|---|---|
| Time of run | 12.75 hr. |
| Av. polymer feed, cc./hr | 310. |
| Av. feed 2% $CH_3ONa$, cc./hr | 130. |
| Alkalinity range, percent $CH_3ONa$ | 0.21–0.24. |
| Temperature, °C | 55–56.5. |
| Polyvinyl alcohol, percent yellow | 6.8 (Gen. Elec. reflectometer). |
| Polyvinyl alcohol, percent yellow blank run | 12.0 (Gen. Elec. reflectometer). |
| Derived polyvinyl butyral, percent yellow | 2.8 (Gen. Elec. reflectometer). |
| Derived polyvinyl butyral, percent yellow, blank run | 6.8 (Gen. Elec. reflectometer). |

*Example 13.—Sulfuric acid pretreatment and sodium metabisulfite*

Four thousand grams of a 31.5% solids in methanol solution of high viscosity polyvinyl acetate, which would yield polyvinyl alcohol of about 55 to 60 cp. viscosity (4% solution in water), was mixed with 66.5 cc. of 1% sulfuric acid at 60° C. for one hour and was then rapidly cooled to room temperature. This acid-treated polyvinyl acetate solution was then subjected to alcoholysis in a continuous process.

The apparatus consisted essentially of three glass vessels arranged in series so that effluent from one overflowed into the next. The contents in all three vessels were kept agitated by the usual types of stirring devices. The first vessel served as the main reactor in which alcoholysis of the polyvinyl acetate largely took place. The second vessel was the finisher in which alcoholysis was carried to the degree desired and the overflow from this finisher then entered the third vessel which served as neutralizer in which the alkali catalyst was neutralized by addition of acetic acid.

Five hundred cc. of methanol and 10 cc. of 10% sodium methylate were heated to 56° C. with stirring in the first vessel or reactor. The sulfuric acid treated polymer was added to the solution of catalyst, with good mixing, at an average rate of about 370 cc. per hour for nine hours. A two percent solution of sodium methylate in methyl alcohol was also fed to the reactor at about 86 cc. per hour. The percent sodium methylate in the reactor varied from 0.91 to about 0.21% during most of the run. The temperature of the reactor varied between 55–56.5° C. The slurry of polyvinyl alcohol in the reactor was fairly thin and mobile. After two hours operation the mixture from the reactor flowed continuously to the second vessel or finisher where the alcoholysis was completed. The slurry of polyvinyl alcohol flowed continuously from the second vessel, after four hours operation, into the third vessel or neutralizer where the sodium methylate was neutralized with acetic acid. The product after the first five hours of operation was considered typical of this system. The polyvinyl alcohol so produced was filtered off and dried for characterization. The significant variables and the results were as follows:

| | |
|---|---|
| Time of run | 10 hrs. |
| Av. feed polymer, cc./hr | 390. |
| Av. cc. 2% $CH_3ONa$/hr | 120. |
| Alkalinity range percent $CH_3ONa$ | Ca. 0.19–0.21%. |
| Sodium metabisulfite g./hr. av | 0.31 (added in increments to the first vessel every 15 min.). |
| Temperature, °C | 55.3–58. |
| Polyvinyl alcohol, percent yellow | 6.7. |
| Polyvinyl butyral from poly. alc | 6.3% yellow. |
| 10% aqueous solution APHA | <25. |

The color of 6.7% yellow compares with 12 to 14% yellow for polyvinyl alcohol made without the pretreatment with acid or the use of sodium metabisulfite. The 10% aqueous solution prepared from the treated polyvinyl alcohol was <25 APHA color compared with about 250 APHA for the same concentration of polyvinyl alcohol made from untreated polymer.

*Example 14.—Acid pretreatment and sodium hydrosulfite*

The treatment with sulfuric acid was essentially the same as in Example 13. Alcoholysis variables and results were as follows:

| | |
|---|---|
| Time of run | 10 hrs. |
| Av. feed polymer cc./hr | 380. |
| Av. cc. 2% $CH_3ONa$/hr | 128. |
| Alkalinity range, percent $CH_3ONa$ (largely) | 0.19–0.21. |
| Sodium hydrosulfite g./hr. av | 0.1 (added in increments to the first vessel every 15 min.). |
| Temperature, °C | 55.2–57.2. |
| Polyvinyl alcohol, percent yellow | 7.7 (Hunter reflectometer). |
| Polyvinyl butyral from polyvinyl alcohol, percent yellow | 4.7 (Hunter reflectometer). |
| 10% aqueous solution APHA | 125. |

*Example 15.—Sodium metabisulfite and sodium hydrosulfite*

In this experiment the acid treatment of the polymer was eliminated. Sodium metabisulfite and sodium hydrosulfite were added in increments in the alcoholysis vessel every 15 minutes. In other respects the procedure of the previous example was followed. The variables and results obtained were the following:

| | |
|---|---|
| Time of run | 12.75 hr. |
| Av. feed polymer cc./hr | Ca. 282. |
| Av. cc. 2% $CH_3ONa$/hr | 131 |

| | |
|---|---|
| Alkalinity range (mainly) | 0.20–0.22%. |
| Sodium metabisulfite | [1]0.367 g./hr. av. |
| Sodium hydrosulfite | [1]0.23 g./hr. av. |
| Temperature, °C | 54.5–56.6. |
| Polyvinyl alcohol, percent yellow | 7.8 (Gen. Elec. reflectometer). |
| Polyvinyl butyral from polyvinyl alcohol | 2.7 (Gen. Elec. reflectometer). |
| 10% aqueous solution of polyvinyl alcohol | <25. |

[1] Added in increments every 15 minutes.

Polyvinyl acetate of any concentration in alcohol solution may be used provided that the ester is completely dissolved. Concentrations of ester of less than 10% by weight can be treated with sulfuric acid and then alcoholized but in general it is preferably to use concentrations between about 20% and 60% of polyvinyl acetate.

Alkali metal alcoholate, such as sodium methylate, is the preferred alkaline alcoholysis group of catalysts. However, other alkaline catalysts can be used such as sodium hydroxide, potassium hydroxide and others well known to the art.

Saturated unsubstituted monohydroxy alcohols containing up to four carbon atoms may be used as solvents in my process for the production of improved polyvinyl alcohol but methanol is the preferred alcohol. It is preferable to use saturated monohydric alcohols containing 1 carbon atom.

The acid treatment of the polyvinyl ester solution in alcohol may take place at any temperature up to the boiling point. If the treatment is carried out under pressure the temperature of treatment may rise up to 100° C. or higher. However, in the case of methanol solutions, a treating temperature between 50 and 60° C. is preferred.

Based on the polymer solids present in the alcohol solution of the ester, 0.01% to 0.3% of sulfuric acid may be used. The actual amount of acid used will be the smallest amount that will give a final polyvinyl alcohol of improved color and this will in turn depend upon the amount of potential color formers present in the starting raw materials. More than 0.3% of sulfuric acid can be used but the amount of salt in the product will also increase and this generally is undesirable.

Any acid such as a strong mineral acid or a strong organic acid may be used to treat the polyvinyl ester solution. To be a "strong" acid its aqueous solution should be equivalent to or greater than the hydrogen ion concentration of acetic acid. Likewise, the acid should otherwise be compatible with the resin system such that no undesirable side reactions will be caused by its use. Examples of suitable acids are: sulfuric, phosphoric, hydrochloric, acetic, glycollic, gluconic, substituted organic acids such as paratoluene sulfonic and others. However, the preferred acid is sulfuric.

The treating time for the action of the acid on the ester solution may be varied over a wide range. With lower temperatures the treating time will be longer than with temperatures above about 50° C. Treating times as long as several hours are feasible and in many cases a treating time of a few minutes prior to alcoholysis will be adequate provided good mixing is achieved. If desired, the acid treated ester solution may be neutralized with a base, preferably alkali metal alcoholate. In the case of methanol solutions, the use of sodium methylate would be indicated as preferable. If desired, the acid treatment may be followed by alkaline alcoholysis directly without neutralization, in which case some of the alcoholate or alkaline catalyst will react with any free acid present. Sufficient alkali metal alcoholate must be used so that alcoholysis will proceed at the rate desired and there must be some excess over that which reacts with the acid used in the pretreatment.

Aldehyde complexing agents suitable for reducing the color of polyvinyl alcohol are such materials which are known to react with the aldehyde group and which at the same time do not form colored derivatives with them. These agents must not react with the dilute sodium methylate to form derivatives which will yield color in the product polyvinyl alcohol. Suitable aldehyde complexing agents are sodium metabisulfite, hydrazine and salts of hydroxylamine. Effective concentrations of such aldehyde complexing agents for color control lie between about 0.1 to 1.0% based on the weight of polyvinyl alcohol produced. The preferred concentration lies between about 0.25 to 0.6% by weight. The polyvinyl alcohol produced as a powder with aldehyde complexing agent present during alcoholysis will normally have a color about 50% of that produced without the presence of such an agent. Aqueous solutions of such products (about 10% water) will have a color about 10 to 20% of that produced without such agent. Aeration of the solution of the polyvinyl alcohol slurry and solution at about 70–100° C. is helpful in reducing the color of the product to low levels in some cases. A pH between about 6 to 8 is desirable and high pH values are generally undesirable.

Reducing agents added to the alcoholysis solution have an effect similar to that of aldhyde complexing agents. The amounts suitable vary between about 0.1 to 1.0% by weight of the polyvinyl alcohol produced. The preferred range of concentration lies between about 0.25 to 0.6%. Reducing agents suitable as color suppressors are sodium hydrosulfite, zinc formaldehyde sulfoxylate, sodium formaldehyde sulfoxylate and similar reducing agents capable of reacting with color formers present in the alcoholysis system or product. Suitable reducing agents must not react with aldehydes to produce colored derivatives and they must also be inert to polyvinyl acetate and to polyvinyl alcohol under the conditions of alcoholysis and storage of the product.

A synergistic effect on color reduction in polyvinyl alcohol powders, films and aqueous solutions results from the use of both a reducing and an aldehyde complexing agent jointly in the alcoholysis of an alcoholic solution of polyvinyl acetate by the use of an alkali metal alcoholate catalyst. The amount of color suppressing reagents used in combination may lie between about 0.2 and 1%. Each agent may comprise one-half of the weight of the combined agents present. A preferred range of agents is about 0.2 to 0.5% of an aldehyde complexing agent plus about 0.2 to 0.5% of a reducing agent, all weights based on the weight of the polyvinyl acetate alcoholyzed. A preferred combination is the use of a combination of sodium hydrosulfite and sodium metabisulfite. The use of two complexing agents such as sodium metabisulfite and hydrazine are also especially effective in reducing color of polyvinyl alcohol and derived polyvinyl butyral.

I claim:

1. In the process for producing polyvinyl alcohol the steps comprising pretreating a substantially anhydrous alcoholic solution of a polyvinyl ester of a saturated organic acid having one to four carbon atoms with a strong acid and thereafter, before substantial acid-catalyzed alcoholysis of said polyvinyl ester occurs, subjecting said polyvinyl ester solution to alcoholysis by treatment with alkaline alcoholysis catalyst.

2. In the process for producing polyvinyl alcohol of improved color the steps comprising pretreating a substantially anhydrous alcoholic solution of polyvinyl acetate with sulfuric acid and thereafter, before substantial acid-catalyzed alcoholysis of said polyvinyl acetate occurs, subjecting said polyvinyl acetate solution to alkaline alcoholysis.

3. In the process for producing polyvinyl alcohol of improved color by the alkaline alcoholysis of polyvinyl acetate the step which comprises pretreating a methanol solution of polyvinyl acetate with sulfuric acid for a period not to exceed about 2 hours.

4. In the process for producing polyvinyl alcohol the steps comprising pretreating for a period not to exceed about 2 hours a substantially anhydrous alcoholic solution of a polyvinyl ester of a saturated organic acid having one to four carbon atoms with 0.01 to 0.3% by weight of a strong acid based on the weight of the ester present, and thereafter subjecting said polyvinyl ester solution to alcoholysis by treatment with alkaline alcoholysis catalyst.

5. In the process for producing polyvinyl alcohol of improved color the steps comprising pretreating for a period not to exceed about 2 hours a substantially anhydrous alcoholic solution of polyvinyl acetate with 0.01 to 0.3% by weight of a strong organic acid based on the weight of the acetate present, and thereafter subjecting said polyvinyl acetate solution to alcoholysis by treatment with alkaline alcoholysis catalyst.

6. In the process for producing polyvinyl alcohol of improved color the steps comprising pretreating for a period not to exceed about 2 hours a substantially anhydrous alcoholic solution of polyvinyl acetate with 0.01 to 0.3% by weight of a strong mineral acid based on the weight of the acetate present, and thereafter subjecting said polyvinyl acetate solution to alcoholysis by treatment with alkaline alcoholysis catalyst.

7. In the process for producing polyvinyl alcohol of improved color the steps comprising pretreating for a period not to exceed about 2 hours a substantially anhydrous alcoholic solution of polyvinyl acetate with 0.01 to 0.3% by weight of sulfuric acid based on the weight of the acetate present, and thereafter subjecting said polyvinyl acetate solution to alcoholysis by treatment with alkaline alcoholysis catalyst.

8. In the process for producing polyvinyl alcohol of improved color by the alkaline alcoholysis of polyvinyl acetate the step which comprises pretreating a methanol solution of polyvinyl acetate with 0.01 to 0.3% by weight of sulfuric acid based on the weight of the polyvinyl acetate present for a period not to exceed about 2 hours.

9. In the process for producing polyvinyl alcohol of improved color the steps comprising pretreating for a period not to exceed about 2 hours a methanol solution of polyvinyl acetate with 0.01 to 0.3% by weight of sulfuric acid based on the polyvinyl acetate present and thereafter alcoholizing said polyvinyl acetate dissolved in said solution by treatment with catalyzing amounts of sodium methylate.

10. In the process for producing polyvinyl alcohol of improved color the steps comprising treating for a period not to exceed about 2 hours an alcoholic solution of polyvinyl acetate with about 0.01 to 0.3% by weight of a strong acid based on the weight of said acetate, thereafter subjecting said polyvinyl acetate in solution to alcoholysis by treatment with alkali metal alcoholate in catalytic proportions in the presence of about 0.1 to 0.5% by weight of an aldehyde complexing agent and in the presence of about 0.1 to 0.5% by weight of a reducing agent, said agents being substantially non-reactive with the non-color-forming components of the alcoholysis mixture.

11. In the process for producing polyvinyl alcohol of improved color the steps comprising treating for a period not to exceed about 2 hours an alcoholic solution of polyvinyl acetate with about 0.01 to 0.3% by weight of a strong acid based on the weight of said acetate, thereafter subjecting said polyvinyl acetate in solution to alcoholysis by treatment with alkali metal alcoholate in catalytic proportions in the presence of about 0.1 to 1.0% by weight of an aldehyde complexing agent, said agent being a non-color former with any components of the alcoholysis mixture.

12. In the process for producing polyvinyl alcohol of improved color the steps comprising treating for a period not to exceed about 2 hours an alcoholic solution of polyvinyl acetate with about 0.01 to 0.3% by weight of sulfuric acid based on the weight of said acetate, thereafter subjecting said polyvinyl acetate in solution to alcoholysis by treatment with alkali metal alcoholate in catalytic proportions in the presence of about 0.1 to 1.0% by weight of a reducing agent, said agent being substantially non-reactive with the non-color-forming components of the alcoholysis mixture.

13. In a process for the production of polyvinyl alcohol of improved color the steps comprising the alcoholysis of polyvinyl acetate in an alcohol solution by subjecting said acetate to the catalytic action of alkali methal alcoholate in the presence of about 0.1 to 0.5% by weight of an aldehyde complexing agent and in the presence of about 0.1 to 0.5% by weight of a reducing agent, said agents being substantially non-reactive with the non-color-forming components of the alcoholysis mixture.

14. In the process for producing polyvinyl alcohol the steps comprising treating for a period not to exceed about 2 hours an alcoholic solution of polyvinyl acetate with about 0.01 to 0.3% by weight of a strong acid based on the weight of said acetate and thereafter subjecting said polyvinyl acetate in alcohol solution to alcoholysis with alkali metal alcoholate in catalytic proportions in the presence of about 0.1 to 0.5% by weight of sodium hydrosulfite and in the presence of about 0.1 to 0.5% by weight of sodium metabisulfite.

15. In the process for producing polyvinyl alcohol the steps comprising treating for a period not to exceed about 2 hours an alcoholic solution of polyvinyl acetate with about 0.01 to 0.3% by weight of sulfuric acid based on the weight of said acetate and thereafter subjecting said polyvinyl acetate in alcohol solution to alcoholysis with alkali metal alcoholate in catalytic proportions and in the presence of about 0.1 to 0.5% by weight of sodium hydrosulfite and in the presence of about 0.1 to 0.5% by weight of sodium metabisulfite.

16. In the process for producing polyvinyl alcohol the steps comprising treating for a period not to exceed about 2 hours an alcoholic solution of polyvinyl acetate with about 0.01 to 0.3% by weight of sulfuric acid of said acetate and thereafter subjecting said polyvinyl acetate in alcohol solution to alcoholysis with alkali metal alcoholate in catalytic proportions and in the presence of about 0.1 to 0.5% by weight of sodium hydrosulfite.

17. In the process for producing polyvinyl alcohol the steps comprising treating for a period not to exceed about 2 hours an alcoholic solution of polyvinyl acetate with about 0.01 to 0.3% by weight of sulfuric acid of said acetate and thereafter subjecting said polyvinyl acetate in alcohol solution to alcoholysis with alkali metal alcoholate in catalytic proportions and in the presence of about 0.1 to 0.5% by weight of hydrazine.

18. In the process for producing polyvinyl alcohol the steps comprising treating for a period not to exceed about 2 hours in alcoholic solution of polyvinyl acetate with about 0.01 to 0.3% by weight of sulfuric acid of said acetate and thereafter subjecting said polyvinyl acetate in alcohol solution to alcoholysis with alkali metal alcoholate in catalytic proportions and in the presence of about 0.1 to 0.5% by weight of hydroxyl amine.

19. In the process for producing polyvinyl alcohol the steps comprising treating for a period not to exceed about 2 hours an alcoholic solution of polyvinyl acetate with about 0.01 to 0.3% by weight of sulfuric acid of said acetate and thereafter subjecting said polyvinyl acetate in alcohol solution to alcoholysis with alkali metal alcoholate in catalytic proportions and in the presence of about 0.1 to 0.5% by weight of a formaldehyde sulfoxylate.

References Cited in the file of this patent

UNITED STATES PATENTS

| | | |
|---|---|---|
| 2,356,282 | Stamatoff | Aug. 22, 1944 |
| 2,447,140 | Shelton et al. | Aug. 17, 1948 |
| 2,499,924 | Lavin | Mar. 7, 1950 |
| 2,642,420 | Kenyon et al. | June 16, 1953 |

UNITED STATES PATENT OFFICE
CERTIFICATE OF CORRECTION

Patent No. 2,850,489                                  September 2, 1958

Norris Turnbull

It is hereby certified that error appears in the printed specification of the above numbered patent requiring correction and that the said Letters Patent should read as corrected below.

Column 2, line 49, for "55-65.5° C." read -- 55-56.5° C. --; column 8, line 7, for "0.91" read -- 0.19 --.

Signed and sealed this 25th day of November 1958.

(SEAL)
Attest:

KARL H. AXLINE
Attesting Officer

ROBERT C. WATSON
Commissioner of Patents